(12) United States Patent
Grubb et al.

(10) Patent No.: US 7,930,234 B2
(45) Date of Patent: Apr. 19, 2011

(54) REAL TIME TRADING

(75) Inventors: Marcus Grubb, London (GB); Andre Keijsers, London (GB); Philip McConnell, Middlesex (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 1631 days.

(21) Appl. No.: 10/386,976

(22) Filed: Mar. 12, 2003

(65) Prior Publication Data

US 2004/0181474 A1 Sep. 16, 2004

(30) Foreign Application Priority Data

Feb. 28, 2003 (GB) .................................. 0304637.2

(51) Int. Cl.
*G06Q 40/00* (2006.01)
(52) U.S. Cl. .......................................... 705/37; 705/35
(58) Field of Classification Search .................. 705/35, 705/36, 37
See application file for complete search history.

(56) References Cited

U.S. PATENT DOCUMENTS

| | | | | |
|---|---|---|---|---|
| 6,014,627 A * | 1/2000 | Togher et al. | ...................... | 705/1 |
| 6,260,025 B1 * | 7/2001 | Silverman et al. | ............. | 705/37 |
| 6,304,858 B1 * | 10/2001 | Mosler et al. | ................... | 705/37 |
| 7,233,923 B1 * | 6/2007 | Wallace et al. | ................. | 705/37 |
| 7,333,950 B2 * | 2/2008 | Shidler et al. | ................... | 705/35 |
| 7,337,140 B2 * | 2/2008 | Brady et al. | ..................... | 705/37 |
| 7,526,446 B2 * | 4/2009 | Aguais et al. | ................... | 705/38 |
| 2002/0032646 A1 * | 3/2002 | Sweeney et al. | ................. | 705/38 |
| 2002/0052816 A1 * | 5/2002 | Clenaghan et al. | ............. | 705/36 |
| 2002/0055897 A1 * | 5/2002 | Shidler et al. | ................... | 705/35 |
| 2002/0099641 A1 * | 7/2002 | Mills et al. | ...................... | 705/37 |
| 2002/0099651 A1 * | 7/2002 | May | ............................... | 705/38 |
| 2002/0116317 A1 * | 8/2002 | May | ............................... | 705/37 |
| 2003/0014345 A1 * | 1/2003 | Lim | ................................ | 705/36 |
| 2003/0023525 A1 * | 1/2003 | Chen | .............................. | 705/35 |
| 2003/0033212 A1 * | 2/2003 | Sandhu et al. | .................. | 705/26 |
| 2003/0061069 A1 * | 3/2003 | Silverman et al. | ................ | 705/1 |
| 2003/0083973 A1 * | 5/2003 | Horsfall | .......................... | 705/37 |
| 2003/0093351 A1 * | 5/2003 | Sarabanchong | ............... | 705/36 |
| 2003/0135448 A1 * | 7/2003 | Aguias et al. | ................... | 705/38 |
| 2003/0135450 A1 * | 7/2003 | Aguais et al. | ................... | 705/38 |
| 2006/0224492 A1 * | 10/2006 | Pinkava | .......................... | 705/37 |
| 2007/0208655 A1 * | 9/2007 | Wallace et al. | ................. | 705/37 |
| 2009/0204674 A1 * | 8/2009 | Lim | ............................... | 709/205 |

FOREIGN PATENT DOCUMENTS

| WO | WO 01/07986 | * | 2/2001 |
|---|---|---|---|
| WO | WO 01/33462 | | 5/2001 |

* cited by examiner

*Primary Examiner* — Jagdish N Patel
*Assistant Examiner* — Kenneth Bartley
(74) *Attorney, Agent, or Firm* — Brinks Hofer Gilson & Lione

(57) ABSTRACT

A computer based system for executing transactions involving financial instruments, comprising a central host computer system, and a network of client computer systems including browser-based software which is adapted to present different interfaces to different trading parties, and also adapted to enable the different parties to set permission filters which control the presentation of information relating to their own trading, to other parties.

8 Claims, 3 Drawing Sheets

REAL TIME TRADING

REFERENCE TO RELATED APPLICATIONS

This application claims priority pursuant to 35 U.S.C. §119 to UK Application No. 0304637.2, filed Feb. 28, 2003.

BACKGROUND OF THE INVENTION

This invention relates to a method of facilitating the operation of markets for financial instruments such as "SWAPS". In particular it relates to a system which utilises internet browser-type software to present different interfaces to trading parties who have different rights of access to the system, and also to present different views of the activities of other parties.

Preferably, the invention provides an interconnecting network of internet browser based software applications delivered from a central host to traders at regulated banks to trade as principals, to brokers at regulated brokerages to trade as agents and to credit officers at regulated banks to input counterparty credit limits.

Preferably the system is delivered centrally over a high powered telecommunications network from a central host.

In a preferred form of the invention, there are three user interfaces and the internal workings of the system are designed to support multiple types of users and multiple trading processes. For example a trader at a regulated bank uses an interface to anonymously price disseminate, price discover and trade directly with other regulated banks or to perform the same activities via a regulated broker or brokers, or to perform both activities at the same time. A broker at a regulated brokerage uses a different interface to price disseminate and discover non-anonymously and to enter orders/prices and execute orders on behalf of regulated banks by entering the code name of the bank on whose behalf they are acting. A third non-trading interface is available for credit officers at regulated banks to input counterparty credit limits to enable the system to automatically cross-match and clear credit limits during the trade process. The system is also designed to enable trading to take place without the loading of any credit limits in to the system—it is at the discretion of the regulated banks.

"Permissions Filter"

Market participants in the current voice and manual marketplace regard their price/order information as proprietary in nature. A key problem to solve in any electronic system for OTC derivatives is how to ensure that the correct orders/prices are sent only to the correct parties. According to a preferred feature of the present invention the price dissemination, price discovery, order management and trade management is all conducted via a "permissions filter" central to the system. This operates in the following manner: As orders/prices are entered into the system by regulated banks themselves and by regulated brokers on behalf of regulated banks they are routed to the central servers. The orders/prices are ranked by price and by time of receipt into a display of the available marketplace of orders/prices showing a "touch" bid and offer price and a ranked order book of less competitive and timely bids and offers for each instrument in each maturity. This market view is then re-transmitted to each regulated bank and regulated broker on the system. The re-transmission takes place using a unique "permissions filter" which cross-maps the regulated banks and regulated brokers that the order enterer or order viewer is/is not permissioned to see and be seen by. The system does this for every order/price entered into the system by every system member and then constructs the market view of orders/prices appropriate to each member's permission set. The result is that the market view of available prices/orders in the same instruments and maturities presented to each member bank and broker will be different depending upon the cross-mapping of permission sets. Only two parties with identical permission sets will see the same marketplace. Even then, the permissions are alterable within the set by members themselves who can turn permissioned parties on and off as they interact with the system. This means that even with identical permissions one party may not see what an identical party sees because they have been switched off momentarily by a third party sending in an order/price. As a result the system only shows orders/prices to banks and brokers that are permissioned to see them by the order/price enterer. Thus the proprietary nature of the orders/prices entered into the system is maintained. This process of order/price ranking and filtering via cross-mapped permission sets and re-transmission is tailored to each system member bank and broker and is conducted by the system continuously in real-time.

The trading modules of the user interface allow trading to occur between regulated banks directly, between regulated banks via a regulated broker and between banks and brokers in multiple combinations. Once an available order/price is hit/executed by a trader at a bank or by a broker at a brokerage the appropriate dealing tickets appear electronically on screen to the appropriate counterparties to facilitate the trade to be negotiated and executed. Not only does the system present the appropriate deal tickets to each participant, if a sequence of complex negotiations occurs between the parties, the system also facilitates this and presents at every step of the negotiations the correct information and selectable fields in order to negotiate, finalize terms and execute the transaction.

SWAP SPREAD PRICE DISSEMINATION, DISCOVERY, ORDER AND TRADE MANAGEMENT The trading module also contains a second OTC derivatives instrument market known as "swap spreads". The swap spread market is a derivative of the interest rate swap market and a single spread instrument is always composed of two interest rate swaps in differing maturities (see Appendix I). The system uniquely solves the problems of electronic price dissemination, price discovery, order management, trade management and the automatic matching of spreads and the automatic linkage to the underlying interest rate swaps market. If two interest rate swap orders/prices are entered into the system in differing maturities by banks or brokers, under certain circumstances the system will auto-generate a single resulting spread order/price and put it into the swaps spread marketplace. If a spread price/order is entered into the system by a bank or broker, under certain circumstances the system will auto-generate a single or pair of swap orders/prices and put them into the swap marketplace. The system continuously chains swap orders/prices and spread orders/prices throughout all maturities in both the swap marketplace and the spread marketplace automatically in order to assist swap and spread traders and brokers and to generate as much market depth as possible in both markets. When a price/order is hit/executed in either the swap or spread markets the system will automatically present the correct trading tickets to all the banks and brokers in the chain in order to manage and execute all the trades.

BACKGROUND OF THE OTC DERIVATIVES MARKETPLACE

The development and growth of the OTC swap market has been dramatic in recent years and continues to grow with a total estimated notional amount of US$99.8 trillion outstanding in June 2001, of which interest rate derivative contracts accounted for US$67.5 trillion (see FIG. 1). Catalyst to this growth has been the advent of the European Monetary Union and the demand for solutions aimed to meet end-users' interest rate exposure. Since its inception in 1976, the OTC derivatives market continues to grow at a steady pace. The total estimated notional amount of outstanding contracts as at June 2001 was US$99.8 trillion, a 5% increase over December 2000 and a 35% rise from June 1998. Growth in the second half of the year came mainly from interest rate swaps and currencies. The IRS and interest rate derivatives markets grew in line with the OTC market in general, to a new high in notional out-standings of US$67.5 trillion. IRS contracts grew by 17% from June 1999 to June 2001 and the fastest growing segment was Euro denominated IRS. The market consists of approximately 500 banks and 40 brokers. The share of brokers in transaction volume is slowly declining at around 40%. The top 40 banks account for 80% of the business by value. Swaps are traded in the following currencies: US$38%, Euro 38%, Yen 10% and other currencies 14%. Euros denominated swaps are now equal to or exceed USD denominated swaps.

In the OTC derivatives market, participants hedge their exposure risks to movements in interest rates, exchange rates, equity prices, commodity prices and credit through OTC contracts. Interest rate derivative contracts—which include interest rate swaps ("IRS"), forward rate agreement ("FRA"), spreads, caps and floors, swaptions, etc, account for 68% of the total.

The market participants are banks, inter-bank brokers and end-customers (i.e. corporate treasuries, funds). In terms of transactions, 60% are executed directly between banks, and the remaining 40% involve brokers. The key players are a handful of large market making banks and brokers who provide prices to other market players.

DETAILED DESCRIPTION OF THE PREFERRED EMBODIMENT

Figure 1:
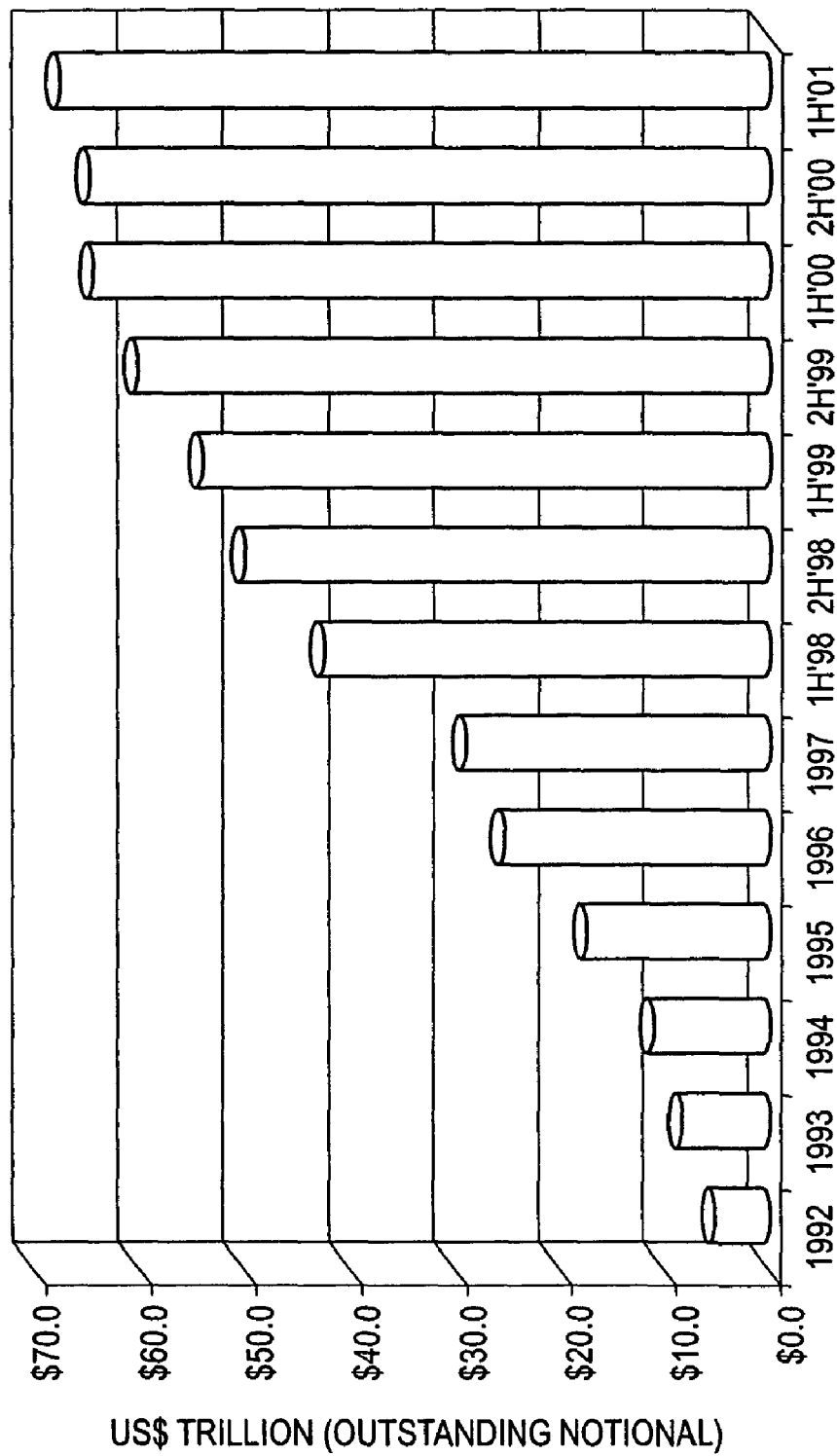
FIG. 1 shows a graph of the OTC interest rate derivatives market.

One embodiment of the present invention will now be described by way of example.

The preferred embodiment of the invention supports price discovery, trade execution, credit clearing and confirmation for swaps and derivatives. The system enables banks to trade directly or through a broker on live prices, and send electronic confirmations by fax, e-mail or FpML format and via the SWIFT secure payments system if desired.

In addition, the service offers full Straight Through Processing ("STP") capabilities and be integrated with various critical internal systems like credit checking, risk management, trade capture, settlement & confirmation, data storage and management, and external services like futures platforms, SWIFT messaging, clearing, bond trading, etc. The application requires minimal software on the customers' PC (called 'thin client technology') and can therefore be implemented very quickly over networks.

The system guarantees anonymity for banks until the moment of trade execution when credit approval is done or required. Bids/offers are live for trading and displayed to the system members. Accessed through a private IP network the drop-down menus of the front-end application consist of a trading centre for posting yield curves electronically, trading on bids/offers and countering, a credit/risk management centre delivered to the members LAN enabling the credit department to internally update credit/counterparty limits and an alert centre for prices and alerts.

The OTC derivatives transaction system is an integrated network of desktop applications through which a member can enter a yield curve of bids and offers and the size at which they are prepared to deal. The orders can be directed to brokers or to other member banks via a sophisticated permissioning system which reflects existing trading behaviour. The system also networks into the credit and risk management departments of member firms allowing the credit and trading limits to be updated in real time and reflected to the dealers. The system operates a credit clearing function. The secure IP private network connects banks and brokers to the system.

The core application acts as a real-time transaction manager tracking the status of individual IRS transactions. The indicative IRS yield curve is supplied by analytics from Gottex and other brokers, seamlessly linked into the core systems. The curves for IRS, forward swaps and spreads feed in automatically and traders can then submit counter bids and offers to improve the curve. All market members are able to use the same module to feed their prices into the system electronically. Additional integrated applications generate the ETCs by e-mail and fax. Using a common IP interface, members are able to enter information concerning yield curves and proposed transactions.

The system guarantees anonymity for banks until the moment of trade execution when credit approval is required. Bids/offers are live for trading and displayed to the system members. Accessed through the private IP network the drop-down menus of the front-end application consist of a trading centre for posting e-yield curves, trading on bids/offers and countering, a credit/risk management centre delivered to the members LAN enabling the credit department to internally update credit/counterparty limits and an alert centre for prices and alerts.

The front-end enables the retrieval of IRS records from the databases and report production by date, currency, customer, term etc. The trading centre conforms to the generally accepted calculations and representations of OTC derivatives transactions governed by the existing marketplace. The system manual explains the basic transaction types. The system improves trading efficiency and provides an e-audit and record keeping function enabling a ticket-less process.

The market maker electronically inputs a bid/offer and a counterparty accepts it to trade, the system automatically generates order confirmation screens to all parties showing that they have traded, displaying the full terms and revealing the counterparties for credit checking. If a credit check is required the trade remains open linked to live prices until the counterparties accept each other's credit. When they finally accept the trade, the ETCs can be sent out automatically by the core system.

The system is preferably compliant with SwapsWire and SwapsClear and has the ability to send/transfer Excel, FpML and SWIFT MT3X if required. There are Excel APIs for both price feeds and credit/risk limit feeds, FpML capability to generate formatted trade confirmations and also SWIFT MT3X trade clearing standards.

The front-end is designed to be intuitive, navigable and easy to use with the minimum number of mouse clicks in order for a member to trade. It accommodates both inter-bank brokers and banks and provides a wealth of information to the trader.

Brokers that join will be able to hook up their analytics to the system in order to submit their indicative curves.

The system enables banks and brokers to realize efficiency gains in the confirmation and processing of OTC derivatives transactions. Once a trade has taken place the system generates multiple confirmations automatically. These can be sent by rapid fax and e-mail, reducing back office costs. The system loads and calculates the default commission rate on every brokered transaction. The broker can aggregate commissions, adjust the amounts and invoice banks electronically on a monthly basis.

The platform is preferably capable of sending FpML message types to banks on the Swaps Wire processing platform and SWIFT messages to offer e-STP via LCH Swap Clear, enabling Swap Clear members to "novate" swap trades for multi-lateral clearing. Finally, Swapstream employs fully backed-up data storage and online recovery, allowing members online access to their historic trades, versus the current manual retrieval from paper archives. This data can also be downloaded in various file formats. In the near future this facility permits netting and assignment of swap and OTC derivatives positions within Swapstream.

As the futures hedging and collateral management process of the IRS and OTC derivatives markets becomes more sophisticated, the system will preferably be arranged to offer both bloc futures crossing via Eurex and automated clearing and multi-lateral netting via Swap Clear, releasing capital and further reducing bank's costs of trading.

Application Architecture

Figure 2:
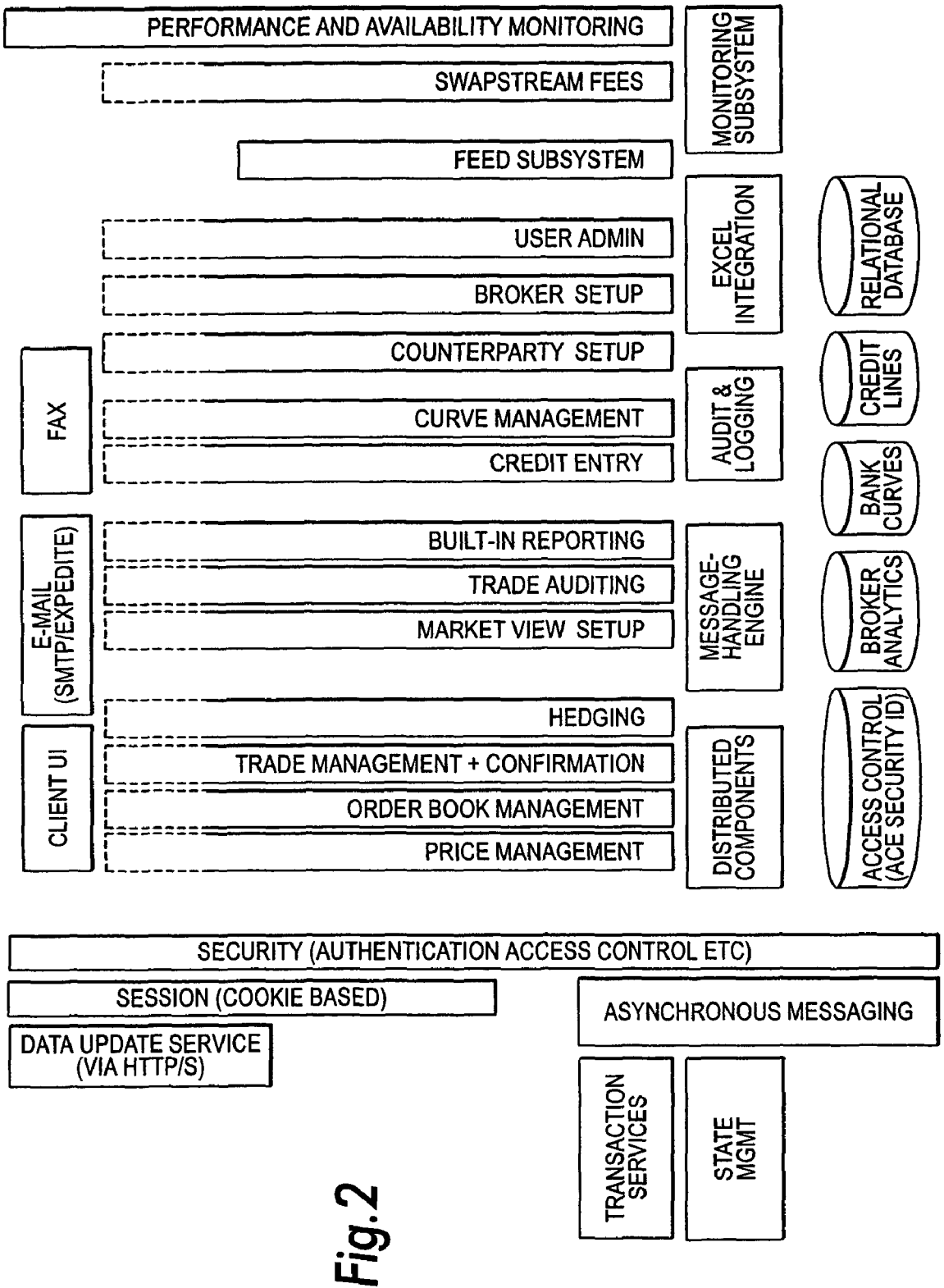
FIG. 2 shows a chart concerning the communication of information pertinent to the present invention; and, FIG. 3 shows a schematic view of a hardware infrastructure for implementing the present invention.

The system provides an on-line electronic platform to facilitate the near real time trading of swaps in Euros and Swiss Francs. Subsequent phase deliveries will be prioritized and agreed via the User Board and the Swapstream product development team. Already the initial Phase 2 business requirements have been discussed with customers; these will be agreed by end of Q4 2002, after which the design and build team will begin development. The application architecture is designed for scalability, performance and resilience as shown in FIG. 2.

The Presentation layer, also called User Interface, is intuitive, navigable and easy to use with the minimum number of mouse clicks in order for a trader to hit a bid or lift an offer, supply a counter-bid or offer or enter an OTC transaction. The front-end application will be initially designed to accommodate both inter-bank brokers and banks.

The Data Delivery processing layer is concerned with taking feeds from credit departments, broker analytics systems and bank curve management systems and passing them through into the Swapstream system.

The Business Logic and Data Services Areas are responsible for providing the core exchange-type functionality of the system. These areas aggregate pricing, order and credit information entered via the client user interface, the front-end interfaces and the back-end data feeds to form the market order book and best prices, and provides the logic behind the trading process. It breaks down into three smaller areas order management, price management and trade management & confirmation.

Figure 3:
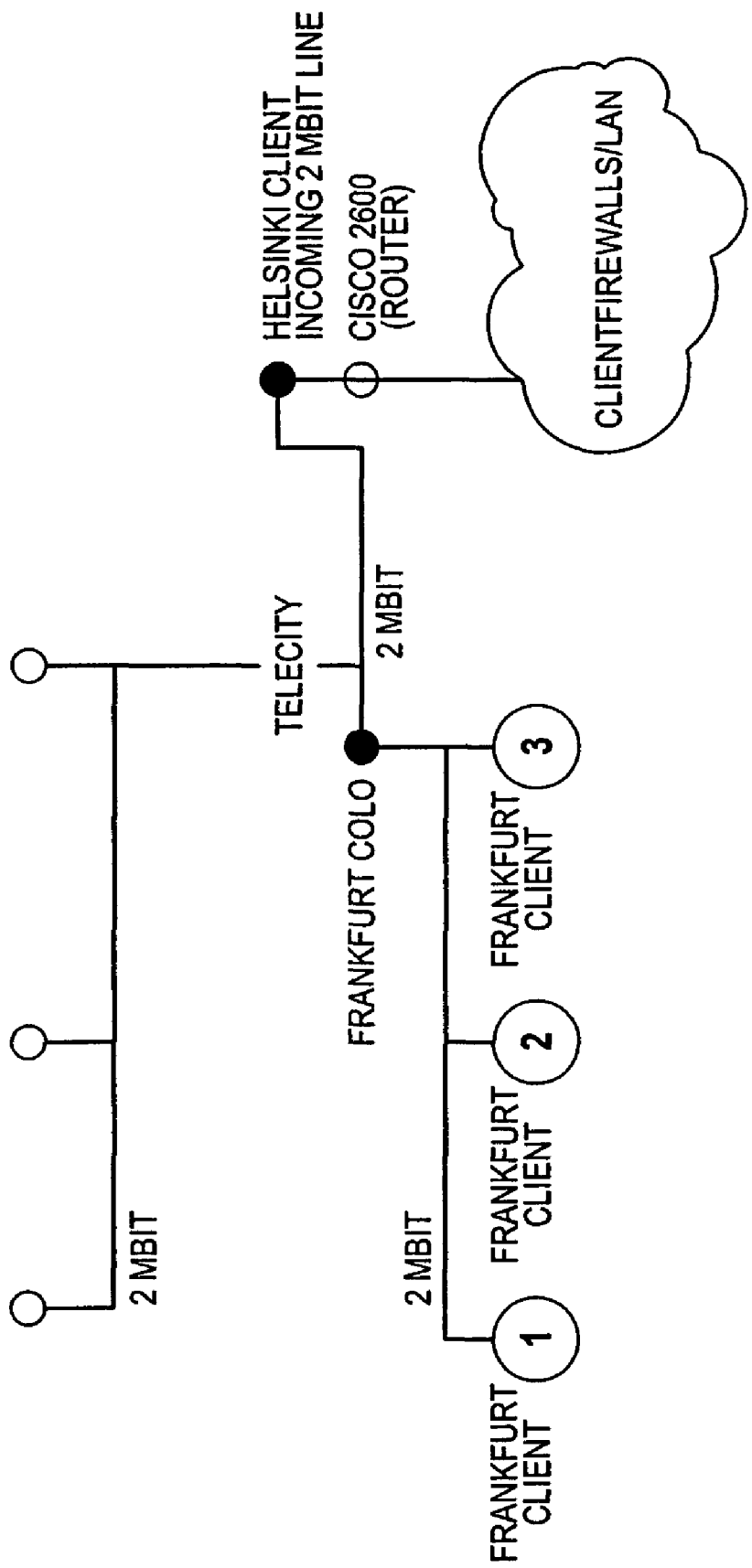

The approach to performance and scalability of the Swapstream system architecture is based around a combination of methods, including:
  Volumetric modeling to predict the performance and identify potential bottlenecks
  Partitionable design to maximize horizontal (cross-server) scalability.
  Event driven, predominantly stateless architecture to support partitionable design
  Use of high-performance software solutions—for example
    Latest version of BEA Web logic uses the most recent optimizations
    Performant messaging software, such as Talarian Smart-Sockets, that support the
    event driven architecture
  Careful messaging design to minimize network traffic
  Design and software selection that maximize vertical scalability
  Stress testing and profiling to provide validation of the volumetric models
Infrastructure & Network One example of hardware infrastructure (FIG. 3) consists of Sun SPARC-3 servers running Solaris 2.8, with the Oracle database 8.0 hosted on a highly redundant Sun server. All central hardware is hosted in central hosting facilities.

The diagram above shows an example of how the back end servers will be linked to the client LAN's:

The platform will be available during swaps trading hours and for some time afterwards to allow tidying up, i.e. from 6 am to 10 pm (ECT) during the working week. Availability outside these hours it is desirable to allow access to our audit and reporting features. However, it is not essential as volumes will be virtually non-existent.

During trading hours, the system is highly available. It is particularly important that if the system becomes unavailable to only a subset of users for any reason, this can be detected and their orders pulled. Seamless fail over if a front-end server goes down is in place, as is the preservation of orders should an order management server fail. A shutdown process operates like a remote exchange, should central price feeds fail.

In the first launch, the screen includes the real-time swap yield curve, which is displayed at all times, a maturity swap spread curve, and later forward/forward swaps, short swaps and Eonias. The curve prices are color coded to show the status of the prices. In all types of curve, the application allows a trader to trade any maturity displayed on the live curves. An electronic deal ticket is displayed when an order is hit. The deal ticket automatically contains as much information as possible and allows the trader to hit at a specified size and price, which the system then automatically matches for price and size in the market and displays the relevant confirmation screens to the parties involved. Orders executed and awaiting name-check are subject to markets and credit approval; prices are automatically updated In line with market movements. Confirmation screens show all the terms of the swap and reveal the counterparty. If the trader wishes to alter details of the transaction, the full ticket allows the trader to change then submit the amended trade, using real time messaging. Broker members of the system are able to enter prices on behalf of customers and hit orders on their behalf, whether or not they are platform members. A broker trade generates a three way confirmation.

The trading blotter displays both the traders' live trades and completed trades, the completed trades are displayed at the bottom of the blotter. The credit/risk management screen allows credit and risk managers to enter credit and trading limits to be displayed to their own traders. The system stores this data and uses it to perform a central credit clearing function between counterparties without revealing confidential information to other system members. As a result of varying permissions, the system displays the curves differently to each member firm. The front-end also contains filters to cross check inputs from banks and brokers as well as live price feeds from Reuters, Bloomberg, and Eurex etc. to avoid incorrect information being entered into the system.

Member firms are also able to configure the permissioning to their own requirements, for example, displaying their prices only to selected counterparties or viewing prices from and sending prices to only those parties with whom they have fully cleared for credit (see Appendix II and III).

The invention claimed is:

1. A computer-assisted method for administering financial transactions for over-the-counter (OTC) financial derivative products, comprising:
   receiving at a central host computer, from each of a plurality of remote computers each associated with a trading party of a plurality of trading parties, a yield curve associated with a plurality of proposed transactions for OTC financial derivative products of varying maturities and permission data associated therewith, the associated permission data identifying which of the other of the plurality of trading parties are granted permission to view the yield curve;
   cross-mapping, by the central host computer, the received yield curve associated with proposed transactions according to maturity and the associated permission data;
   compiling, by the central host computer, a market view of proposed transactions for each trading party of the plurality of trading parties according to the cross-mapping, each market view of proposed transactions for each trading party excluding proposed transactions of other of the plurality of trading parties from who appropriate permission to view a proposed transaction has not been granted; and
   transmitting from the central host computer to the plurality of remote computers, each of the market views to a corresponding trading party of the plurality of trading parties.

2. The method of claim 1 where the associated permission data comprises credit preferences of the trading party for at least one other trading party of the plurality of trading parties.

3. The method of claim 2 further comprising coordinating, by the central host computer, a transaction for an OTC derivative product, the transaction being initiated in response to a trading party hitting a proposed transaction in a market view transmitted to the trading party.

4. The method of claim 3 where each market view of proposed transactions includes auto-generated liquidity compiled according to the cross-mapping.

5. The method of claim 3 further comprising:
   automatically generating, by the central host computer, an implied swap quote for a derivative financial instrument based on two or more swap quotes of differing maturity available to a trading party from other trading parties according to the associated permission data of the other parties.

6. The method of claim 3 further comprising:
   automatically generating, by the central host computer, a swap spread market for the trading party, the swap spread market including derivative financial instruments based on two or more quotes of differing maturity available to the trading party from counterparties parties according to the associated permission data of the counterparties and the trading party.

7. A computer-assisted method for administering financial transactions for over-the-counter (OTC) financial derivative products, comprising:
   receiving at a central host computer, from a plurality of remote computers each associated with a trading party of a plurality of trading parties, data associated with proposed transactions for OTC financial derivative products and permission data associated therewith, the data associated with proposed transactions including a price quote, and maturity for the OTC derivative product, the associated permission data identifying which of the other of the plurality of trading parties are granted permission to view the data associated with each proposed transaction;
   cross-mapping, by the central host computer, the received data associated with proposed transactions according to maturity, the price quote and the associated permission data;
   compiling, by the central host computer, a market view of proposed transactions for each trading party of the plurality of trading parties according to the cross-mapping, each market view of proposed transactions for each trading party excluding proposed transactions of other of the plurality of trading parties from who appropriate permission to view a proposed transaction has not been granted;
   transmitting from the central host computer to the plurality of remote computers, each of the market views to a corresponding trading party of the plurality of trading parties; and
   automatically generating, by the central host computer, an implied swap quote for a derivative financial instrument based on two or more swap quotes of differing maturity available to a trading party from other trading parties according to the associated permission data of the other parties.

8. A computer-assisted method for administering financial transactions for over-the-counter (OTC) financial derivative products, comprising:
   receiving at a central host computer, from a plurality of remote computers each associated with a trading party of a plurality of trading parties, data associated with proposed transactions for OTC financial derivative products and permission data associated therewith, the data associated with proposed transactions including a price quote, and maturity for the OTC derivative product, the associated permission data identifying which of the other of the plurality of trading parties are granted permission to view the data associated with each proposed transaction;
   cross-mapping, by the central host computer, the received data associated with proposed transactions according to maturity, the price quote and the associated permission data;
   compiling, by the central host computer, a market view of proposed transactions for each trading party of the plurality of trading parties according to the cross-mapping, each market view of proposed transactions for each trading party excluding proposed transactions of other of the plurality of trading parties from who appropriate permission to view a proposed transaction has not been granted;
   transmitting from the central host computer to the plurality of remote computers, each of the market views to a corresponding trading party of the plurality of trading parties; and automatically generating, by the central host computer, a swap spread market for the trading party, the swap spread market including derivative financial instruments based on two or more quotes of differing maturity available to the trading party from counterparties parties according to the associated permission data of the counterparties and the trading party.

* * * * *